G. P. FULLER.
KNITTING MACHINE.

No. 75,260.  Patented Mar. 10, 1868.

Witnesses

Inventor

United States Patent Office.

GUY P. FULLER, OF ADRIAN, MICHIGAN.

*Letters Patent No. 75,260, dated March 10, 1868.*

---

INDICATOR FOR KNITTING-MACHINES.

---

The Schedule referred to in these Letters Patent and making part of the same.

---

Know all men that I, GUY P. FULLER, of Adrian, in the county of Lenawee, and State of Michigan, have invented a new and useful Improvement in an Indicator for Knitting-Machines; and I do declare that the following is a true and accurate description thereof, reference being had to the accompanying drawings, and to the letters of reference marked thereon, and being a part of this specification.

Figure 1:
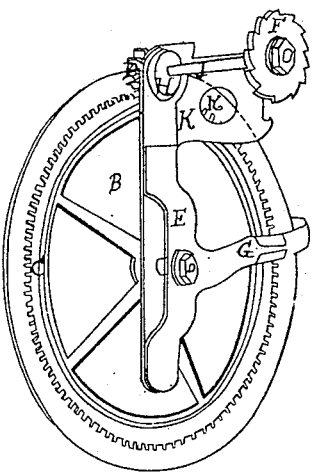
Figure 2:
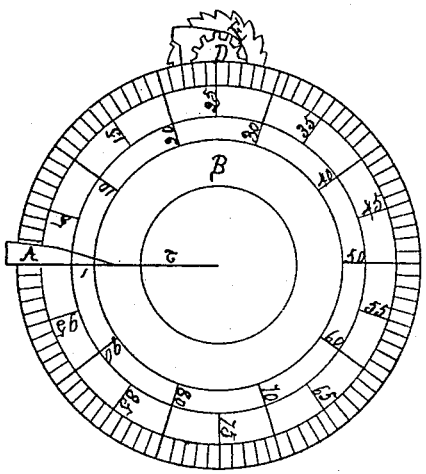

Figure 1 is a rear view of my invention, and
Figure 2 a front view of the same.
The same letters indicate like parts in each figure.

The object of this invention is to so construct an indicator, to be attached to a "Lamb knitting-machine," that it will correctly indicate the number of rounds knit, and so that it can be attached to the knitting-machine without altering the machine in any particular.

In order to do this, I construct an ordinary disk, B, appropriately divided and numbered, and attached to the geared wheel C, which is also attached to a proper shaft, which passes through the frame E. To the frame E is attached the lever G, to which is also attached the finger A. D is a pinion, meshing into and communicating motion to the geared wheel C, and is attached to the shaft J, upon the opposite end of which is placed the ratchet-wheel F, and secured in its place by the nut I. H is a rubber friction-wheel, also placed on the shaft J, and whose face presses against the plate K, for the purpose of preventing any backward motion.

To attach this indicator, which is more expressly designed as an attachment to the "Lamb knitting-machine," although it may be applied to other machines for a similar purpose.

To attach it to a Lamb knitting-machine, take off the nut at the right-hand end of the rod that carries the yarn-guide, push it to the left, put on the indicator at the left-hand end of the rod, passing the rod through the opening K in the plate, put the rod in its proper place again, and tighten up the nuts. Then attach a proper pawl, by taking out the upper screw in the lever that moves the yarn-guide, slipping the pawl on to the screw, and put the screw back in place, taking care to keep the under side of the pawl close to the lever. Be particular to have the pawl strike square into the ratchet, and it is ready for operation.

What I claim as my invention, and desire to secure by Letters Patent, is—

The combination of the finger A, the disk or dial-plate B, the geared wheel C, the pinion D, or their equivalents, the frame E, the ratchet F, the lever G, the friction-wheel H, the nut I, the shaft J, the plate K, when constructed substantially as described for the purposes herein set forth.

GUY P. FULLER.

Witnesses:
NORMAN GEDDES,
W. F. CORNELL.